Dec. 15, 1970  R. H. GRIESER  3,547,489
SAFETY SEAT
Filed Nov. 4, 1968

INVENTOR.
ROBERT H. GRIESER
BY
Woodard, Weikart, Emhardt & Naughton
ATTORNEYS

United States Patent Office 3,547,489
Patented Dec. 15, 1970

3,547,489
SAFETY SEAT
Robert H. Grieser, 3512 Rockville Road,
Indianapolis, Ind. 46222
Filed Nov. 4, 1968, Ser. No. 772,901
Int. Cl. A62b 35/00
U.S. Cl. 297—385                     5 Claims

ABSTRACT OF THE DISCLOSURE

A child's safety seat for use with the conventional seat structure of an automobile. The seat includes a swivel mounted guide extending from the opposite sides of the seat for receiving and retaining the safety belt. The seat also has on its lower surface serrations for maintaining the position of the seat on the seat structure.

BACKGROUND OF THE INVENTION

Field of the invention

This invention relates to a child's safety seat for use in automobiles or the like.

Description of the prior art

Various types of child's safety seats have been devised and are known in the art. For example, U.S. Pats. 3,136,579 to Hunter, 3,232,665 to Von Wimmersberg and 3,220,769 to Regan show such seats. The prior art devices have not been entirely satisfactory for a number of reasons. First, some of the prior art devices unduly restrict the movement of the child which often results in the child crying or demanding release from the device. Second, certain of the prior art devices do not locate the child's head sufficiently high up in the automobile to permit the child to see out of the automobile and to enjoy the same scenery as adults in the automobile. Third, some of the prior art devices do not allow easy attachment and detachment of the safety belt from the device when it is desired to move the device. Fourth, certain of the prior art devices do not allow easy adjustment of the device for children of various sizes. Fifth, some of the prior art devices unduly wear the safety belt making it unsafe and requiring early replacement and repair.

SUMMARY OF THE INVENTION

One embodiment of this invention might involve in combination wtih a seat structure and an associated safety belt, said belt being adapted to engage and secure a person in said seat structure, supplemental seat means for supporting a person, said supplemental seat means being supported by said seat structure and comprising a seat portion having a pair of transverse sides, a bar having a pair of loops on the opposite ends thereof, said bar extending through said seat and through the opposite sides and being swivel mounted on said seat portion, said loops being positioned outboard of said sides and sized to receive a safety belt, said loops being rotatable to various angles through the swivel action of said bar.

One object of this invention is to provide an improved child's safety seat for use in automobiles.

Another object of this invention is to provide a seat which permits relatively free movement of the user.

A further object of this invention is to provide a seat which supports the child at a sufficiently high level that he can see out of the automobile.

Still other objects of this invention are: to provide a seat which permits easy attachment and detachment of the safety belt from the seat, to provide a seat which is auomatically adjustable for children of various sizes, and to provide a seat which does not unduly wear the automobile safety belt.

BRIEF DESCRIPTION OF THE DRAWING

The full nature of the invention will be understood from the accompanying drawings and the following description and claims:

DESCRIPTION OF THE PREFERRED EMBODIMENT

Figure 1:
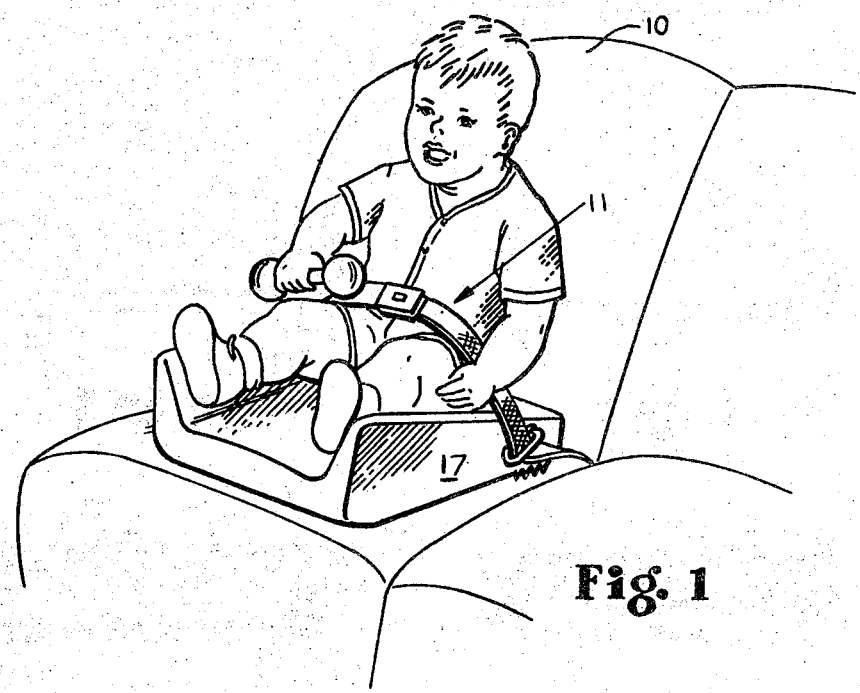
FIG. 1 is a perspective view of the safety seat of the present invention showing it in operation.
Figure 4:
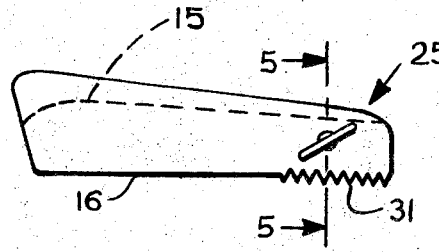
FIG. 4 is a side elevation of the structure of FIG. 3.
Figure 3:
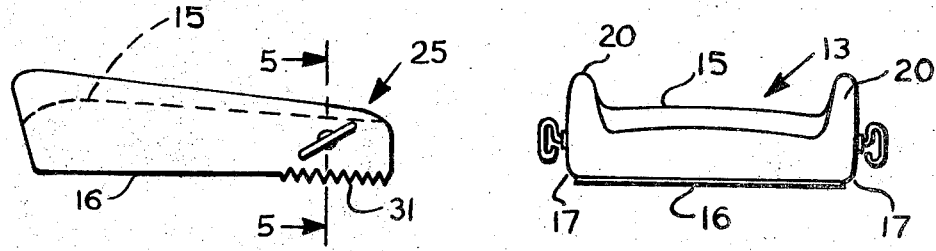
FIG. 3 is a front elevation of the seat arrangement of the present invention.
Figure 5:
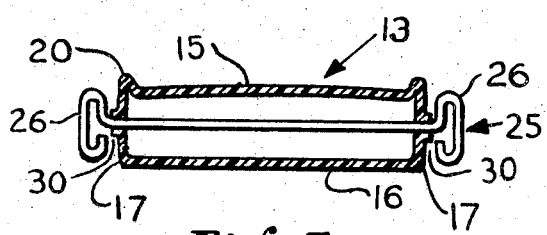
FIG. 5 is a vertical section taken along the line 5—5 of FIG. 4 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated an automobile seat 10 having a standard safety belt 11 associated therewith and fixedly mounted to the frame of the automobile in conventional fashion. The safety seat 12 of the present invention includes a seat portion 13 having a generally horizontal upper surface 15 and a generally horizontal lower surface 16.

Formed integrally with the seat portion 13 and located at the transverse sides 17 of the seat portion are a pair of upright sides guards 20 which extend upwardly above the upper surface of the seat portion. A bar 25 is formed to have a pair of loops 26 on the opposite ends thereof. The loops 26 have generally a configuration appropriately shaped to receive the seat belt 11. It will be noted, however, that the loops 26 are not closed but instead have openings 30 which permit rapid detachment and release of the seat belt from the loops when the two seat belt halves are disconnected. The bar 25 is rotatably mounted upon the seat portion 13 which permits the loops 26 to assume any desired appropriate attitude or angle depending upon the size of the child sitting on the seat portion. On the bottom surface 16 of the seat portion 13 there is provided a series of serrations 31 which act to engage and grip the seat 10 so as to maintain the safety seat 12 firmly positioned on the automobile seat.

Figure 6:
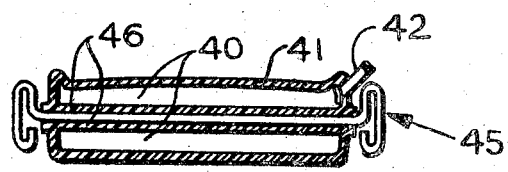
FIG. 6 is a view similar to FIG. 5 of an alternative embodiment of the present invention.
Figure 2:
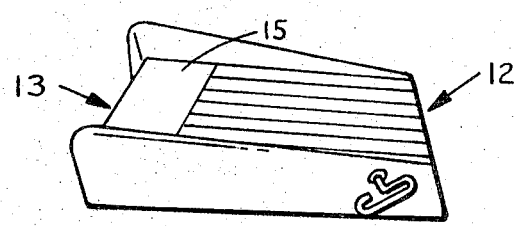
FIG. 2 is a further perspective view of the seat arrangement of the present invention showing it separately from the automobile.

Referring to FIG. 6 there is illustrated an alternative embodiment of the invention which is generally identical to the above described embodiment but which includes a sealed hollow interior 40. Mounted upon the seat portion 41 is a valve structure 42 which is usable to inflate the hollow interior 40 of the safety seat of FIG. 6. It will be noted that appropriate means should be provided for swivel mounting or for rotatable mounting of the bar 45 without permitting leaking of the air pressure from the hollow interior 40 between the safety seat and the bar 45. In FIG. 6 such an arrangement is illustrated as providing a completely sealed bore or hole all the way through the safety seat with the bore being closed off from the hollow interior portion 40 by the material 46.

It will be evident from the above description that this invention provides a safety seat which permits relatively free movement of the user. It will also be evident that the seat of this invention provides a seat which permits easy attachment and detachment of the safety belt from the seat and provides a seat which is automatically adjustable for children of various sizes. It can also be seen that the seat of this invention will not unduly wear the safety belt and also positions the child at adult head level in the automobile.

It should be mentioned that while the present invention is intended for use primarily in an automobile, it may also find application in aircraft and other similar situations. Consequently, the term "automobiles and the like" is used herein to cover these situations.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A safety seat for a child for use with the safety belt of an automobile or the like, said safety seat comprising a seat portion having a relatively horizontal upper surface and a pair of transverse sides, a pair of upright side guards secured to said seat portion at the opposite sides thereof and extending upwardly above the upper surface of said seat portion, a bar having a pair of loops on the opposite ends thereof, said bar extending through said seat and through the opposite sides and being swivel mounted on said seat portion, said loops being positioned outboard of said sides and sized to receive a safety belt, said loops being rotatable to various angles through the swivel action of said bar.

2. In combination with a seat structure and an associated safety belt, said belt being adapted to engage and secure a person in said seat structure, supplemental seat means for supporting a person, said supplemental seat means being supported by said seat structure and comprising a seat portion having a pair of transverse sides, a bar having a pair of loops on the opposite ends thereof, said bar extending through said seat and through the opposite sides and being swivel mounted on said seat portion, said loops being positioned outboard of said sides and sized to receive a safety belt, said loops being rotatable to various angles through the swivel action of said bar.

3. The apparatus of claim 2 wherein said seat portion has a relatively horizontal upper surface and a relatively horizontal lower surface, said seat portion having a rear and a front, said seat portion having a plurality of serrations on its lower surface adjacent its rear, said serrations engaging said seat structure to hold said seat portion in place on said seat structure.

4. The apparatus of claim 3 additionally comprising a pair of upright side guards secured to said seat portion at the opposite sides thereof and extending upwardly above the upper surface of said seat portion, said loops being open at one side thereof so as to permit the seat belts to be placed therein and removed therefrom.

5. The apparatus of claim 4 wherein said seat portion is hollow and sealed closed, and valve means mounted on said portion for inflating said seat portion.

References Cited

UNITED STATES PATENTS

| | | | |
|---|---|---|---|
| 3,161,436 | 12/1964 | Hood | 297—460 |
| 3,136,579 | 6/1964 | Hunter | 297—250 |
| 3,186,762 | 6/1965 | Lucas | 297—385 |
| 3,388,947 | 6/1968 | Rosen | 297—384 |
| 3,484,833 | 12/1969 | Stephen | 182—7X |

JAMES T. McCALL, Primary Examiner

U.S. Cl. X.R.

297—250